United States Patent [19]
Creed et al.

[11] Patent Number: 5,006,927
[45] Date of Patent: Apr. 9, 1991

[54] APPARATUS AND METHOD FOR SEPARATING A COMPONENT OF A COMPOSITE DIGITAL VIDEO SIGNAL

[75] Inventors: David M. Creed, Winchester; James H. Wilkinson, Basingstoke, both of United Kingdom; Robert J. D. Lawlor, Atsugi, Japan

[73] Assignee: Sony Corporation, Tokyo, Japan

[21] Appl. No.: 334,560

[22] Filed: Apr. 7, 1989

[30] Foreign Application Priority Data

Sep. 23, 1988 [GB] United Kingdom ............... 8822394

[51] Int. Cl.⁵ .......................... H04N 9/67; H04N 9/78
[52] U.S. Cl. ........................................ 358/31; 358/30; 358/36
[58] Field of Search .................... 358/31, 39, 40, 36, 358/37

[56] References Cited

U.S. PATENT DOCUMENTS

| | | | |
|---|---|---|---|
| 4,205,335 | 5/1980 | Nakagawa | 358/31 |
| 4,870,482 | 9/1989 | Yasuki | 358/31 |

FOREIGN PATENT DOCUMENTS

| | | |
|---|---|---|
| 281696 | 12/1986 | Japan ............................. 358/31 |
| 2078054 | 12/1981 | United Kingdom . |
| 2163023 | 2/1986 | United Kingdom . |
| 2170975 | 8/1986 | United Kingdom . |
| 2198311 | 6/1988 | United Kingdom . |

OTHER PUBLICATIONS

"The Filtering of Luminance and Chrominance Signals to Avoid Cross-Color in a PAL Color System," J. O. Drewery, BBC Eng., 104/8, Sep. 1976.

"Hardware Investigations into High Quality Digital PAL Decoding and Encoding for the Component Video Environment," D. M. Creed, IBC 1984.

"Improvements to NTSC by Multidimensional Filtering", Dubois, et al., SMPTE Journal, Jun. 1988.

*Primary Examiner*—Tommy P. Chin
*Attorney, Agent, or Firm*—Alvin Sinderbrand; William S. Frommer

[57] ABSTRACT

A composite digital video signal encoder comprises crosstalk measuring filters for measuring crosstalk between luminance and chrominance components of a composite digital video signal, a vertical comb filter and a vertical/temporal filter each operative to separate one of the luminance and chrominance components from the composite signal, a mixer for mixing output signals produced by the vertical and vertical/temporal filters, and a mixer control means responsive to the measured crosstalk to control the mixing ratio of the mixer in a sense to reduce cross effects in the mixed output signal resulting from the crosstalk.

20 Claims, 10 Drawing Sheets

APPARATUS AND METHOD FOR SEPARATING A COMPONENT OF A COMPOSITE DIGITAL VIDEO SIGNAL

BACKGROUND OF THE INVENTION

1. Field of the Invention

This invention relates to methods of and apparatus for component separation of composite digital video signals.

2. Description of the Prior Art

A composite video (television) signal comprises luminance and chrominance components. Two color difference signals that make up the chrominance signal (U/V signals in the case of PAL and I/Q signals in the case of NTSC) are modulated in quadrature on a color subcarrier which has a frequency (e.g. 4.43 MHz for PAL and 3.58 MHz for NTSC) towards the upper end of the frequency band or spectrum (e.g. 0 to 5.5 MHz) occupied by the luminance component. The modulated subcarrier is then added to the luminance component to produce the composite signal. Since the chrominance component occupies an upper portion of the band occupied by the luminance component, crosstalk of luminance into chrominance (known as "cross-color") and of chrominance into luminance (known as "cross-luminance") can occur when the composite signal is separated into its luminance and chrominance components.

Traditionally, a composite signal is separated into its luminance and chrominance components by simple filtering techniques. Thus, a simple notch filter, which passes the whole of the spectrum of the composite signal except for a "notch" region centered on the color subcarrier frequency, because most chrominance energy is concentrated around the color subcarrier frequency, is used to separate the luminance component. However, the notch filter will pass the sidebands of the chrominance signal and thereby allow some of the chrominance to pass through to appear as crosstalk (cross-luminance) on the luminance, the extent of the crosstalk depending on the color content of the picture. This form of crosstalk, arising due to imperfect separation of chrominance from luminance, can manifest itself on a displayed picture in the form of a dot effect at edges of brightly colored objects, this cross effect being known as "subcarrier crawl". A simple bandpass filter, which is centered on the color subcarrier frequency and has a passband of a width similar to that of the band occupied by the chrominance component in the composite signal, is used to separate the chrominance component from the composite signal. Since this filter will pass any luminance energy which is of a high enough frequency to appear within its pass band, it will allow some of the luminance to appear as crosstalk (cross-color) on the chrominance, the extent of the cross-color depending upon the luminance content of the picture. By way of example, a striped pattern on, for instance, an article of clothing can, if more than a certain distance from a video camera, have a spatial frequency which will give rise to a high frequency luminance component which appears as cross-color in the separated chrominance signal and can manifest itself on a displayed picture in the form of a cross effect characterized by a colored rainbow effect superimposed on the distant striped pattern.

The relatively crude separation technique employing simple filters, as described above, is not good enough for use in high quality component video systems, as used for example in broadcasting.

A better degree of luminance/color separation than that obtainable by using simple filtering can be achieved by using comb filtering, which takes advantage of the frequency interleaving that takes place between the luminance and chrominance components of the composite signal. Such frequency interleaving is possible because the spectral characteristics of both the luminance and chrominance energy are determined by the horizontal and vertical scanning of the video signal. Thus, as is well known in the art, the luminance energy within the composite signal is not continuous across the spectrum. Instead, it is concentrated within the spectrum (e.g. 0 to 5.5 MHz) at positions at the line frequency and harmonics thereof, each such concentrated spectral position having sidebands on opposite sides thereof, the spacing between each such pair of sidebands being equal to the field frequency. Little energy is present in the gaps or slots between the line harmonics. The relationship between the line frequency and the color subcarrier frequency (in the case of both PAL and NTSC) is, as is well known in the art, chosen so that the chrominance information (which is distributed in a similar manner to the luminance information) is concentrated at positions between the harmonics of the line frequency (where the luminance energy is concentrated) across the region of the spectrum (the upper end) occupied by the chrominance component. In simpler terms, the chrominance information is frequency interleaved with the luminance information by putting the chrominance information into the gaps or slots between the luminance information towards the upper end of the spectrum of the composite signal.

A comb filter for separating the chrominance component from the luminance component has plural adjacent passbands, the peaks of which are positioned appropriately (in the frequency domain) within the above-mentioned gaps (and the nulls between the peaks of which are positioned to coincide with the line frequency harmonics at which the luminance energy is concentrated) whereby the filter "combs out" the chrominance energy from the gaps between the luminance energy. Conversely, to separate luminance from chrominance, the nulls are positioned appropriately within the gaps (and the peaks coincide with the line frequency harmonics) whereby the filter "combs out" the luminance energy from between the chrominance energy.

In the case of digital composite signals, where digital comb filters are employed, use may be made of vertical (line delay) comb filters, vertical/temporal (field delay) comb filters or temporal (frame delay) filters. Vertical comb filters act within a field of the signal between vertically adjacent samples in different lines of the field. They effect a combing action as just described above. They provide a degree of luminance/chrominance separation which, in general, is much better than that provided by simple filtering. A vertical/temporal (field delay) filter provides a degree of separation which, in general, is even better than that provided by a vertical filter, in that it acts between samples in different fields and performs a finer combing action between interleaving field sidebands that are disposed around the concentrated regions of luminance and chrominance energy that appear in the spectrum. Vertical/temporal filters act between respective consecutive fields, whereby they have a characteristic in the frequency domain which is similar to that of vertical filters except that the peak locations are determined by the field frequency rather than by the line frequency. A temporal (frame delay) filter, which acts in a purely temporal sense, between samples in different frames, is (in principle) even better.

Comb filters in general provide a considerably better degree of component separation (and thus a lesser degree of intercomponent crosstalk) than the simple form of filtering described above, which ignores the frequency interleaving of the component separation and treats the spectrum as if it were continuous. Comb filters are thus better suited to obtaining a high quality interface between composite and component video systems. Nonetheless, crosstalk can occur when comb filters are employed. In this regard, the amount of energy in the gaps or slots in the spectrum between the luminance information are picture-dependent. Thus, if there is a lot of luminance energy in the picture, the slots will tend to fill with luminance energy, to a degree dependent on the picture content, whereby luminance energy will crosstalk into the chrominance regions to provide cross-color. Also, if there is a lot of chrominance energy in the picture, the slots will tend to fill with chrominance energy, to a degree dependent on the picture content, whereby chrominance energy will crosstalk into the luminance regions to provide cross-luminance. The inventors have ascertained that such crosstalk can arise due to high vertical energy in the picture, for example due to a vertical transition (i.e. a change of luminance and/or (in particular) chrominance in the picture in the vertical direction within a field, which change is not necessarily associated with movement) and/or due to high vertical/temporal energy in the picture (e.g. due to a picture change between fields caused by movement).

Since a temporal (frame delay) comb filter acts purely temporally, while it provides good results for a static picture it is highly susceptible to crosstalk in the case of picture movement. The inventors have ascertained that, in general, vertical/temporal (field delay) comb filtering provides a better degree of separation than either vertical (line delay) comb filtering or simple filtering, not only in the case of a static picture but also, in general, in the case of a picture having a moderate amount of movement and a moderate amount of vertical energy. However, in the event of more severe picture movement, vertical/temporal picture energy due to such movement can cross fairly readily into the passbands of a vertical/temporal comb filter, whereby crosstalk (in particular cross-color) can arise in these circumstances when component separation is being obtained by way of a vertical/temporal comb filter.

The inventors have also ascertained that, in practice, a vertical (line delay) comb filter can break down in the case of high vertical energy (e.g. due to vertical chrominance transitions), in that high vertical picture energy can cross fairly readily into its passbands. However, it is not in general so susceptible to movement as a vertical/temporal (field delay) comb filter. (The direction of movement is relevant: it is not susceptible at all to movement along the temporal axis, the degree of susceptibility thus increasing as the direction of movement goes away from that axis.) Further, a vertical/temporal (field delay) comb filter is not so susceptible as a vertical (line delay) comb filter to high vertical energy (e.g. due to vertical transitions) whereby, for example, in the case of vertical/temporal filtering, failure at vertical chrominance transitions is much less evident than in the case of vertical filtering.

UK Patent No. 2 163 023 (Sony Corporation), which is hereby incorporated herein by reference, discloses apparatus for component separation of a composite video signal, the apparatus comprising means for measuring crosstalk between luminance and chrominance components of the video signal, a vertical comb filter for separating the chrominance component from the composite signal, a vertical/temporal comb filter for separating the chrominance component from the composite signal, and means for switching between the vertical filtering and vertical/temporal filtering in response to the crosstalk measured by the crosstalk measuring means so as to reduce cross-effects resulting from the crosstalk.

The switching preferably was smoothed in order that it would occur no more than once every few samples, rather than (as is possible) on a sample by sample basis, with the intention of avoiding unacceptable switching artifacts (i.e. subjectively unacceptable visible phenomena) in the displayed picture. Subject to this limitation, switching between different modes of filtering was effected frequently with the intention of providing the best possible picture. In practice, it has been found that frequent switching, in spite of the smoothing, does give rise to unacceptable switching artifacts. Further, another difficulty arose. This was that certain spatial frequencies gave rise to an uncertainty in the algorithm controlling the switching (in accordance with measured crosstalk) whereby an ambiguity as to which mode of filtering to adopt arose. This gave rise to repetitive switching (as often as the smoothing action would permit) at certain picture boundaries, producing unacceptable picture artifacts.

SUMMARY OF THE INVENTION

One object of the present invention is to provide an improved apparatus for component separation of a composite digital video signal.

Another object of the present invention is to provide an improved method of component separation of a composite digital video signal.

A further object of the present invention is to provide an apparatus for and a method of component separation of a composite digital video signal, in which the problems of unacceptable switching artifacts in the resulting picture arising from frequent or repetitive switching are alleviated or overcome.

According to one aspect of the present invention there is provided apparatus for component separation of a composite digital video signal, the apparatus comprising:

crosstalk measuring means for measuring crosstalk between luminance and chrominance components of the composite digital video signal;

a vertical comb filter for separating one of said components from the composite digital video signal;

a vertical/temporal comb filter for separating said one component from the composite digital video signal;

mixing means operative to mix output signals produced by the vertical comb filter and by the vertical/temporal comb filter, respectively, to produce a mixed output signal containing respective proportions of said output signals; and mixing control means responsive to the crosstalk measured by the crosstalk measuring means to control said proportions in a sense to reduce cross effects in said mixed output signal resulting from said crosstalk.

According to another aspect of the present invention there is provided a method of component separation of a composite digital video signal, the method comprising:

measuring crosstalk between luminance and chrominance components of the composite digital video signal;

separating one of said components from the composite digital video signal by a vertical comb filtering operation;

separating said one component from the composite digital video signal by a vertical/temporal comb filtering operation;

mixing output signals produced by the vertical comb filtering operation and by the vertical/temporal comb filtering operation, respectively, to produce a mixed output signal containing respective proportions of said output signals; and controlling said proportions in response to the measured crosstalk in a sense to reduce cross effects in said mixed output signal resulting from said crosstalk.

The use of adaptive mixing (rather than adaptive switching) of the output signals of the vertical and vertical/temporal filters in accordance with the measured crosstalk enables cross effects to be reduced without introducing unacceptable artifacts in the course of the adaption process.

Preferably, the mixing means is operative to mix the composite digital video signal with said output signals produced by the vertical comb filter and the vertical/temporal comb filter whereby said mixed output signal contains respective proportions of the composite digital video signal and said output signals. The controlled mixing of the composite digital video signal together with the output signals produced by vertical and vertical/temporal filtering enables a better degree of reduction of cross-effects to be achieved.

The above, and other objects, features and advantages of this invention will be apparent from the following detailed description of illustrative embodiments which is to be read in connection with the accompanying drawings.

BRIEF DESCRIPTION OF THE DRAWINGS

FIG. 18 shows a table that can be used to program programmable read only memories (PROMs) in the mixer control means that store coefficients controlling the proportions in which the mixer combines the above-mentioned signals, the particular values in the table showing an example of how the signals are mixed which differs from that shown schematically in FIG. 17; and FIG. 19 shows a table representing the contents of a bypass enhancement PROM of the mixer control means.

DESCRIPTION OF THE PREFERRED EMBODIMENTS

The behaviour of digital comb filters is difficult to comprehend from consideration of the frequency domain only. The complex interaction of luminance and chrominance components in composite video signals, and their processing in comb filters, can be considered to take place in a three-dimensional frequency spectrum or continuum whose axes are vertical frequency, horizontal frequency and temporal frequency. This concept of the three-dimensional nature of a composite video signal is by now well established and is described, for example, in the following: "The Filtering of Luminance and Chrominance Signals to Avoid Cross Colour in a PAL Colour System", J. O. Drewery, BBC Eng., 104/8, Sept. 1976; "Hardware Investigations into High Quality Digital PAL Decoding and Encoding for the Component Video Environment", D. M. Creed, IBC 1984; and "Improvements to NTSC by Multidimensional Filtering", E. Dubois and W. F. Schreiber, SMPTE Journal, June 1988. (See also UK Patent No. 2 163 023 (cited above)).

Figure 1:
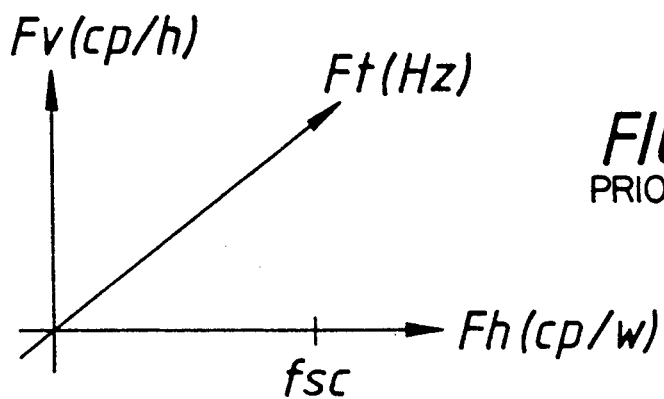
FIG. 1 shows a three-dimensional frequency spectrum or continuum.
Figure 2:
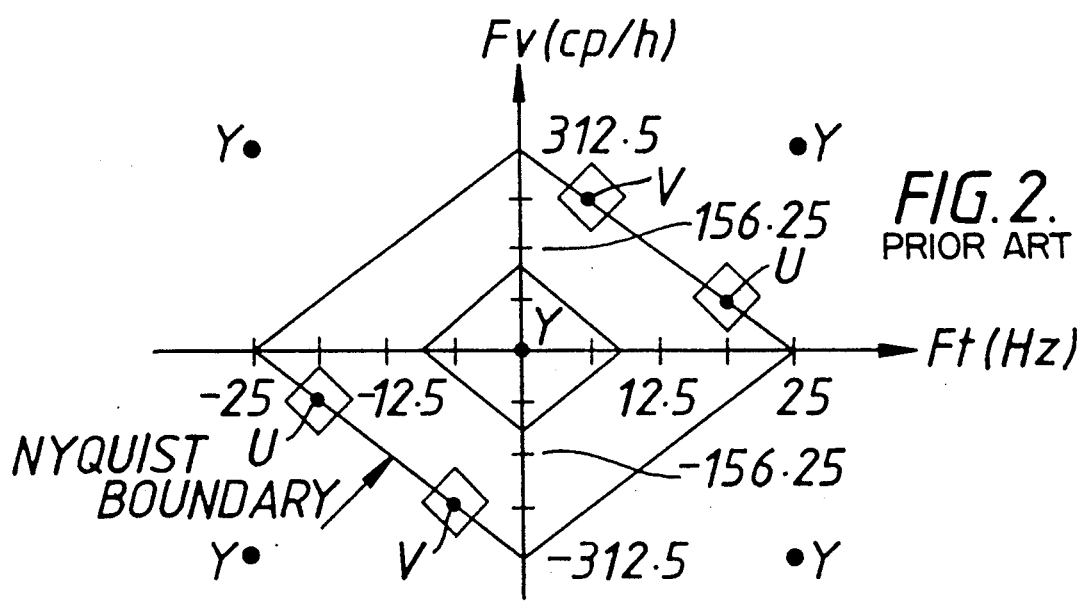
FIGS. 2 and 3 show two-dimensional spectra of sampled PAL and NTSC composite video signals, respectively, in a vertical/temporal plane within the three-dimensional spectrum of FIG. 1.
Figure 3:
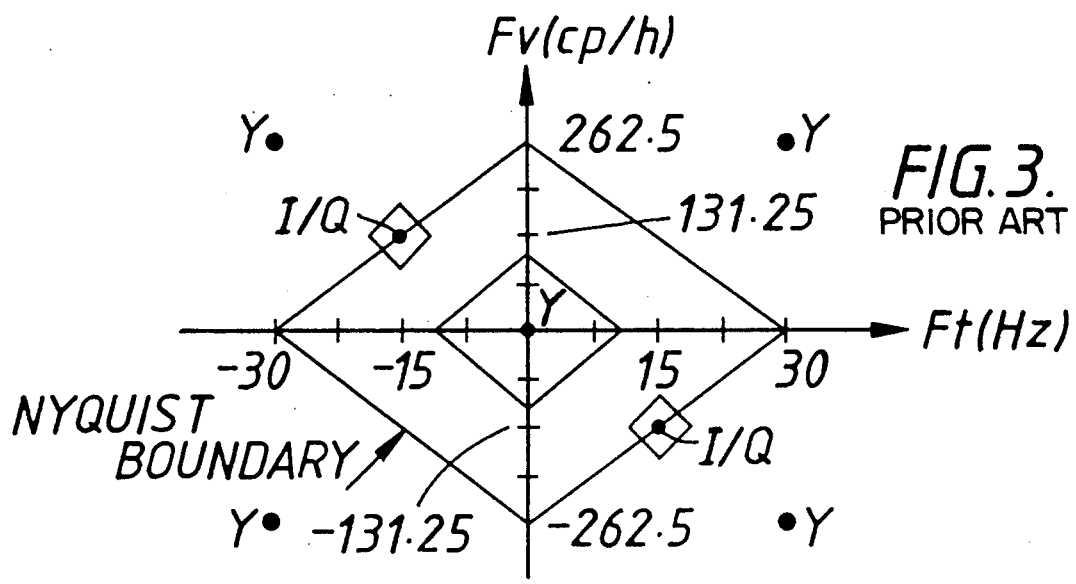

FIG. 1 shows the above-mentioned dimensional frequency spectrum, whose axes are vertical frequency Fv (in units of cycles per picture height (cp/h)), horizontal frequency Fh (in units of cycles per picture width (cp/w)) and temporal frequency Ft (in Hz). Well defined centers of spectral energy for the luminance (Y) and for the color difference signals (U/V for PAL and I/Q for NTSC) exist within the three dimensional spectrum. The positions of these centers can be seen by taking a cross-section in the FV/Ft (vertical/temporal) plane through a position along the Fh axis corresponding to the frequency fsc of the color subcarrier. Taking such cross-sections gives rise to two-dimensional spectra (in the vertical/temporal plane) for PAL and NTSC as shown in FIGS. 2 and 3, respectively. The use of a line-locked sampling frequency for sampling an analog composite signal (for example a frequency of 13.5 MHz in accordance with CCIR Recommendation 601) results in an orthogonal sampling structure (for both PAL and NTSC) enabling the use of line, field and frame-based filtering for separation of the luminance and chrominance components, since all the samples in all the lines in each field are disposed orthogonally with respect to one another. Taking into account the temporal effect due to line interlacing, the sampling structure gives rise to theoretical rhombic Nyquist boundaries as shown in FIGS. 2 and 3. The derivation of the PAL spectrum shown in FIG. 2 is described in more detail in UK Patent No. 2 163 023 (cited above). The NTSC spectrum shown in FIG. 3 is derived in an exactly analogous manner, the main difference being that the NTSC color difference signals I/Q have coincident centers of spectral energy, whereas the PAL color difference signals U/V have spaced centers of spectral energy.

Referring to FIG. 2, the centers of spectral energy for PAL are shown at Y, U and V respectively. Referring to FIG. 3, the centers of spectral energy for NTSC are shown at Y and I/Q respectively. In the case of each of FIGS. 2 and 3, the relevant center Y is that at the origin of the axes Ft and Fv. The baseband spectrum is repeated at harmonics of the sampling frequency whereby the rhombic structure is repeated in all directions, positions of Y for four such repeat spectra being shown in each of FIGS. 2 and 3.

It will be seen from FIGS. 2 and 3 that, for both PAL and NTSC, there is a well defined spacing between the luminance center Y and the chrominance centers U and V or I/Q in both the vertical direction (along the axis Fv) and in the temporal direction (along the axis Ft). These spacings correspond to the above-mentioned frequency interleaving described with respect to the frequency domain and are the basis on which comb filtering is effected, as will now be described.

Figure 4:
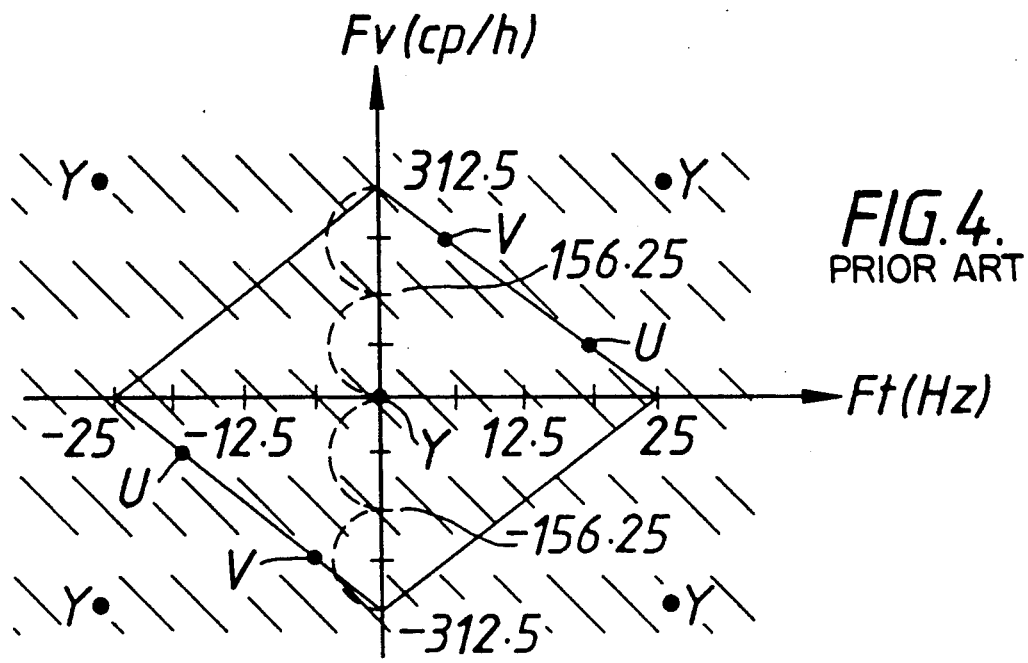
FIGS. 4 and 5 show characteristics of vertical (line delay) chrominance separation comb filters for PAL and NTSC, respectively, superimposed on the spectra of FIGS. 2 and 3, respectively.

FIG. 4 shows the characteristic of a PAL vertical (line delay) comb filter for chrominance separation superimposed on the spectrum of FIG. 2. (Although, for clarity, the filter is shown as having stopbands (hatched areas) positioned vertically as shown and passbands (the regions between the shaded areas) positioned vertically to coincide with the chrominance (color difference) spectral energy centers U and V, in practice it will have a characteristic (as represented schematically by dotted line curves) producing nulls at vertical positions of 0 cp/h, 156.25 cp/h and 312.5 cp/h and peaks at the vertical positions of the chrominance spectral energy centers U and V.) It will be thus evident that the characteristic causes the filter to comb out chrominance energy from the luminance energy.

Figure 5:
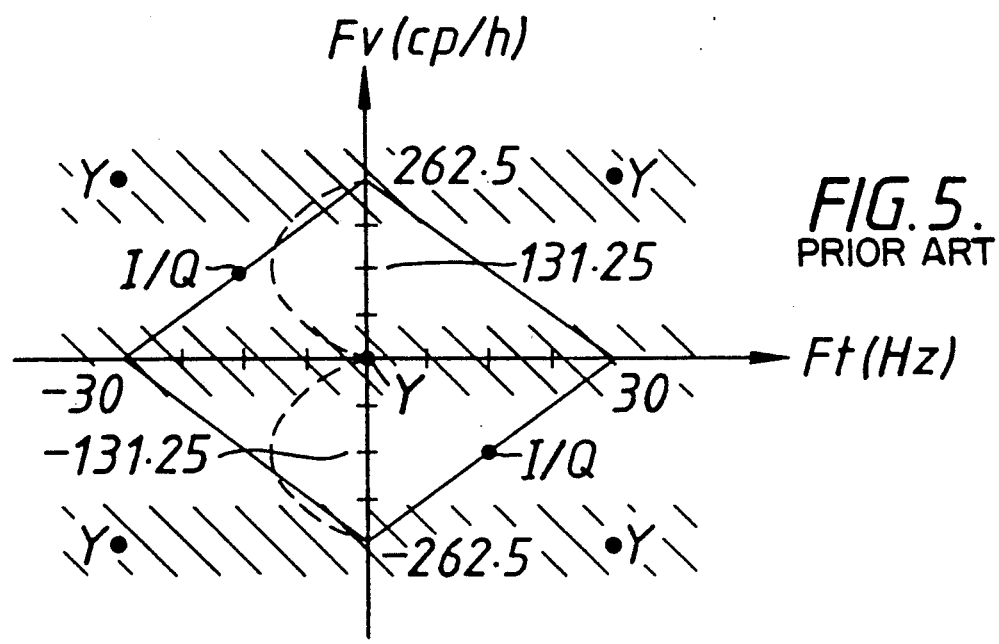

FIG. 5 shows, in similar manner to FIG. 4, the characteristic of an NTSC vertical (line delay) comb filter for chrominance separation superimposed on the spectrum of FIG. 3. (Again, although for clarity, the filter is shown as having stopbands (hatched areas) positioned vertically as shown and passbands (the regions between the shaded areas) positioned vertically to coincide with the chrominance spectral energy centers I/Q, in practice it will have a characteristic (as represented schematically by dotted line curves) that nulls at the vertical positions 0 cp/h and 265.5 cp/h and peaks at the vertical positions of the chrominance spectral energy centers I/Q.) Thus, for NTSC also, the characteristic causes the filter to comb out chrominance energy from the luminance energy.

Figure 6:
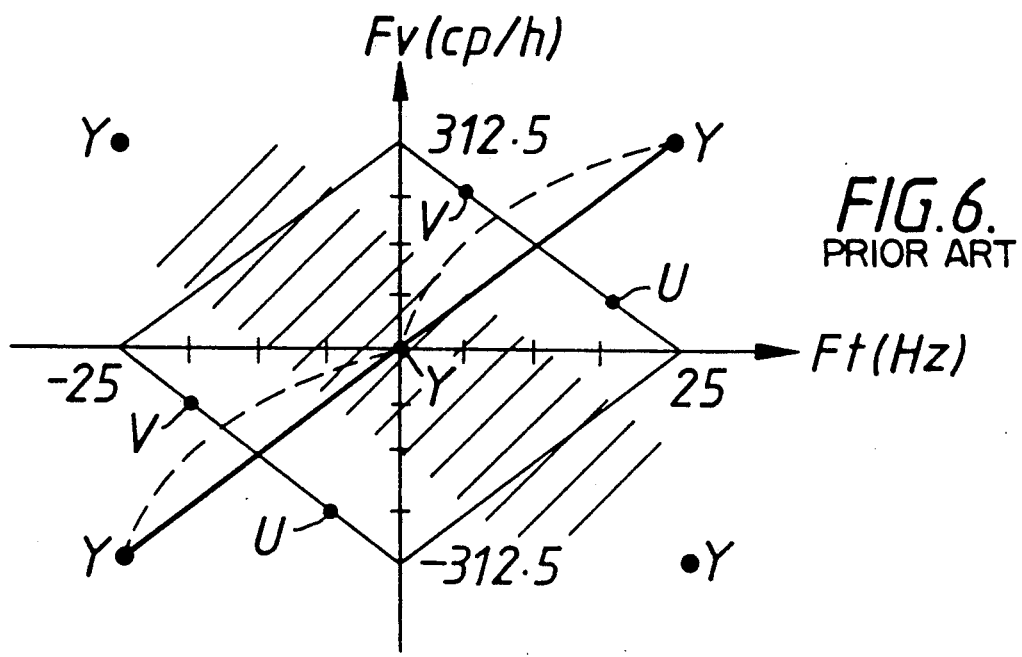
FIGS. 6 and 7 show characteristics of vertical/temporal (field delay) chrominance separation comb filters for PAL and NTSC, respectively, superimposed on the spectra of FIGS. 2 and 3, respectively.
Figure 7:
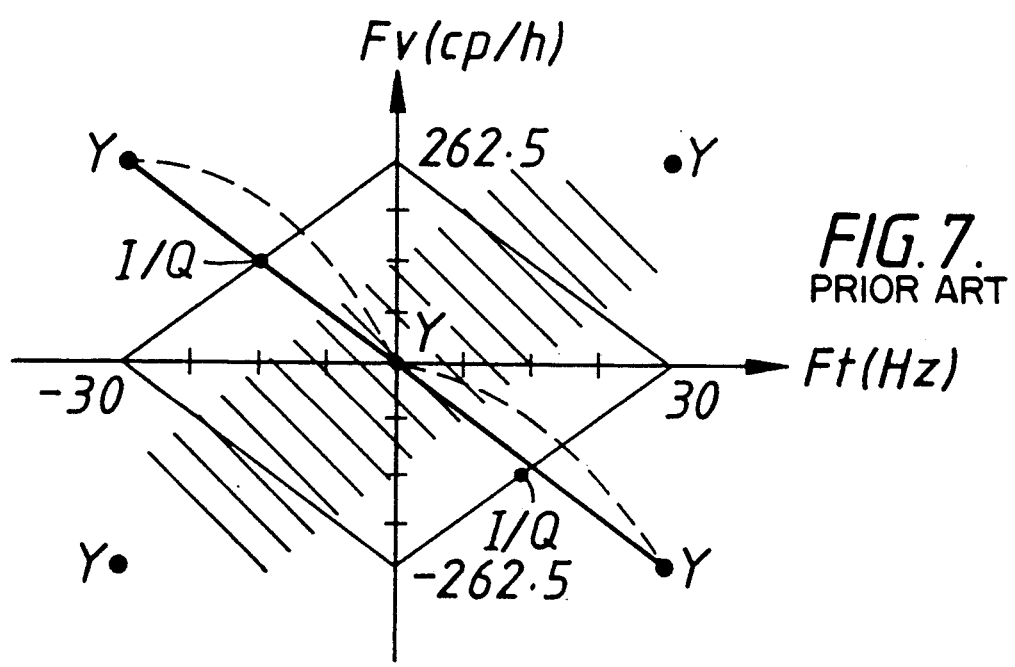

FIGS. 6 and 7 show the characteristics of chrominance separation vertical/temporal (field delay) filters for PAL and NTSC, respectively, superimposed on the spectra of FIGS. 2 and 3, respectively. (Once more, for clarity, the filters are shown as having stopbands (hatched areas) positioned along vertical/temporal (diagonal) axes passing through the luminance spectral energy centers Y and passbands positioned along the vertical/temporal axes to coincide with the chrominance spectral energy centers U/V or I/Q, whereas in practice the filters will have characteristics (as represented schematically by dotted line curves) that null at the vertical/temporal (diagonal) positions of the luminance energy center Y and peak at the vertical/temporal (diagonal) positions of the chrominance spectral energy centers U/V or I/Q.) Thus, for both PAL and NTSC, the filters will comb out chrominance energy in vertical/temporal space from the luminance energy.

Referring back to FIGS. 2 and 3, under normal picture conditions the luminance and chrominance energy is spread out from the spectral energy centers Y, U, V and I/Q, as represented schematically in FIGS. 2 and 3 by boundary lines disposed around the respective centers. The extent and direction of energy disposed away from the centers Y, U, V and I/Q will depend upon picture content. For example, considering the luminance spectral energy center Y, in the case of a static picture having a vertical picture content the luminance energy will be distributed along the vertical axis both upwardly and downwardly from the origin. Thus, as can readily be seen from FIGS. 4 and 5, the line delay chrominance separation comb filter can in this event fail properly to separate the chrominance from the composite video signal in that it will pass some of this vertical luminance energy, whereby crosstalk of luminance into chrominance (cross-color) will appear in the output of the line delay comb filter, the extent of the cross-color depending upon the amount of vertical energy or information in the picture. The line delay comb filter can in fact fail dramatically to properly separate the chrominance in the event of a sharp vertical color transition in the picture, since it relies on the lines between which it filters being correlated. The failure is characterized by a loss of vertical resolution visible to a degree dependent on the impulse response of the filter. Also, some of the vertical luminance energy (in the case of a static picture) may be passed by the field delay chrominance comb filter, although cross effects arising from high vertical energy (e.g. a vertical color transition) will be less visible than in the case of a line delay filter because a field delay filter breaks down over only two lines whereby visibility of the failure is restricted to two lines.

In the case of a moving picture, the luminance energy will be spread away from the luminance energy center Y in both the vertical and temporal directions. Again, both the field delay and line delay chrominance separation comb filters can pass some of this energy (to an extent dependent on movement) to provide cross-color in their outputs, though the field delay comb filter is more likely to fail properly to separate the chrominance under conditions of high vertical/temporal energy. That is, while the field delay comb filter provides substantially perfect resolution for static pictures (except in the case of chrominance transitions), maintaining full vertical resolution, it fails to do so in the case of a picture having a substantial amount of movement and having high vertical energy.

To separate luminance from the composite video signal, comb filtering characteristics which are converse to those of the chrominance separation comb filters are required. This leads to the converse possibility of chrominance crosstalking into luminance to provide cross-luminance in the outputs of the luminance comb separation filters. In fact, a separate set of luminance separation comb filters is not required because a combed luminance signal can be obtained simply by subtracting the combed chrominance signal from the composite video signal. However, since the subtraction operation effectively provides a set of converse luminance separation filters, the possibility of cross-luminance exists.

In an embodiment of the invention described below, the crosstalk between the luminance and chrominance components, which varies with vertical and vertical/temporal energy in the picture, is measured by a vertical (line delay) comb filter, which measures vertical crosstalk energy, and a vertical temporal (field delay) comb filter, which measures vertical/temporal crosstalk energy. To avoid these measurement filters being confused with the above-described line delay and field delay comb filters that effect the separation of the chrominance component, the measurement filters are hereinafter referred to as line crosstalk and field crosstalk energy measurement filters and their outputs are hereinafter referred to as line crosstalk and field crosstalk energy measurement signals.

Figure 8:
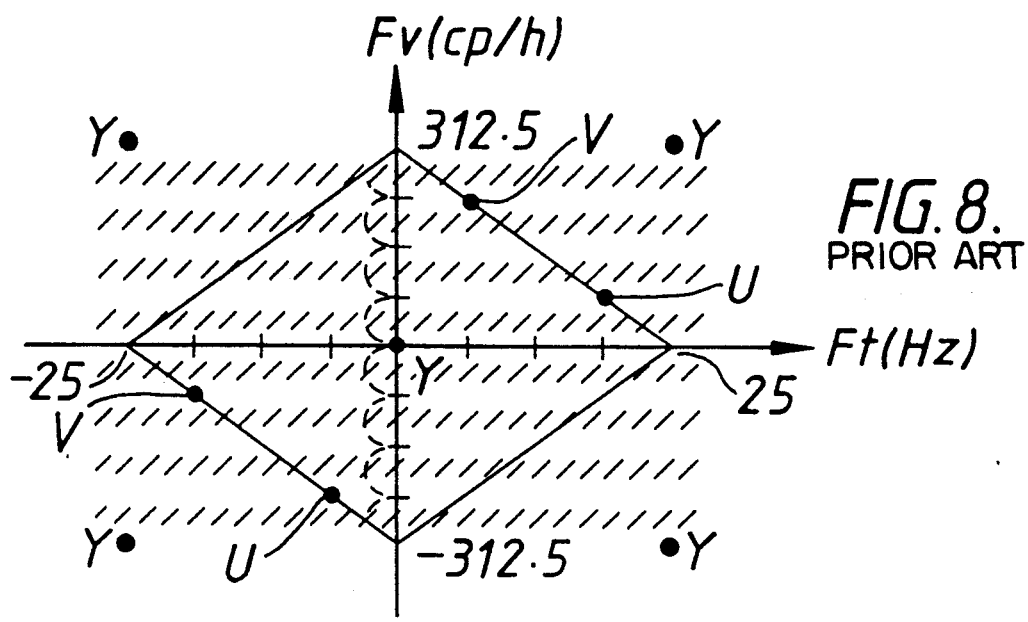
FIGS. 8 and 9 show characteristics of vertical (line delay) comb filters for measuring line crosstalk for PAL and NTSC, respectively, superimposed on the spectra of FIGS. 2 and 3, respectively.
Figure 9:
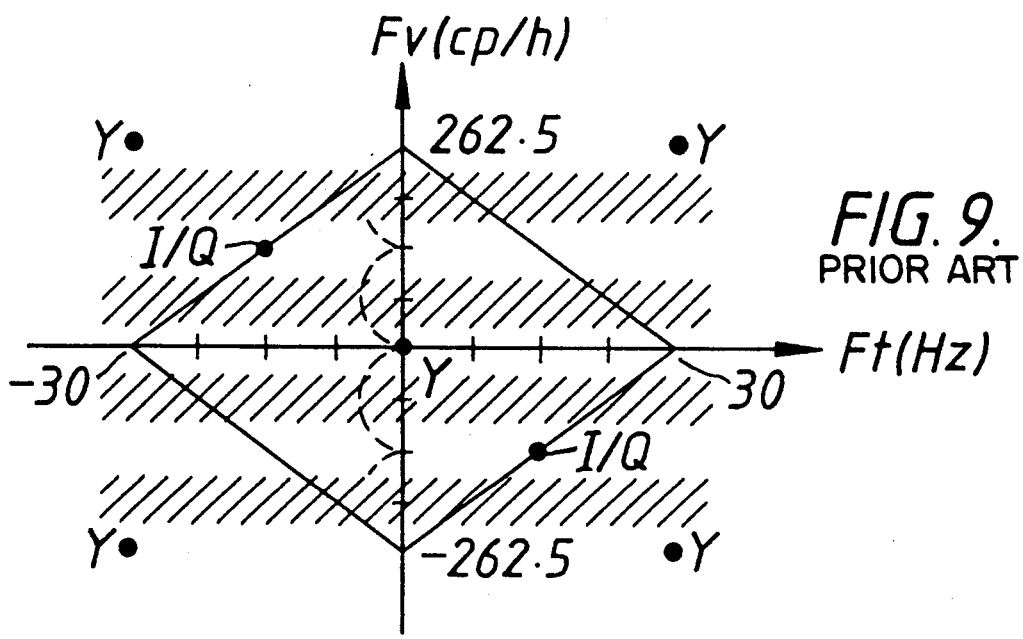

FIGS. 8 and 9 show the characteristics of the line crosstalk energy measurement filters for PAL and NTSC, respectively, superimposed on the spectra of FIGS. 2 and 3, respectively. The characteristics are shown in FIGS. 8 and 9 in a similar way to that in which the characteristics of the chrominance separation vertical (line delay) comb filters are shown in FIGS. 4 and 5, except that, in FIGS. 8 and 9, the hatched areas represent passbands rather than stopbands. It will be noted (see also the dotted lines) that in the case of each of FIGS. 8 and 9 the characteristics have nulls at the vertical positions of both the luminance spectral energy centers Y and the chrominance spectral energy centers U and V (or I/Q) and have peaks at positions spaced vertically between those centers. Thus, the line crosstalk energy measurement filters pass vertical energy which is located between the vertical positions of the luminance and chrominance spectral energy centers, whereby the outputs of the filters are representative of line (vertical) crosstalk energy.

Figure 10:
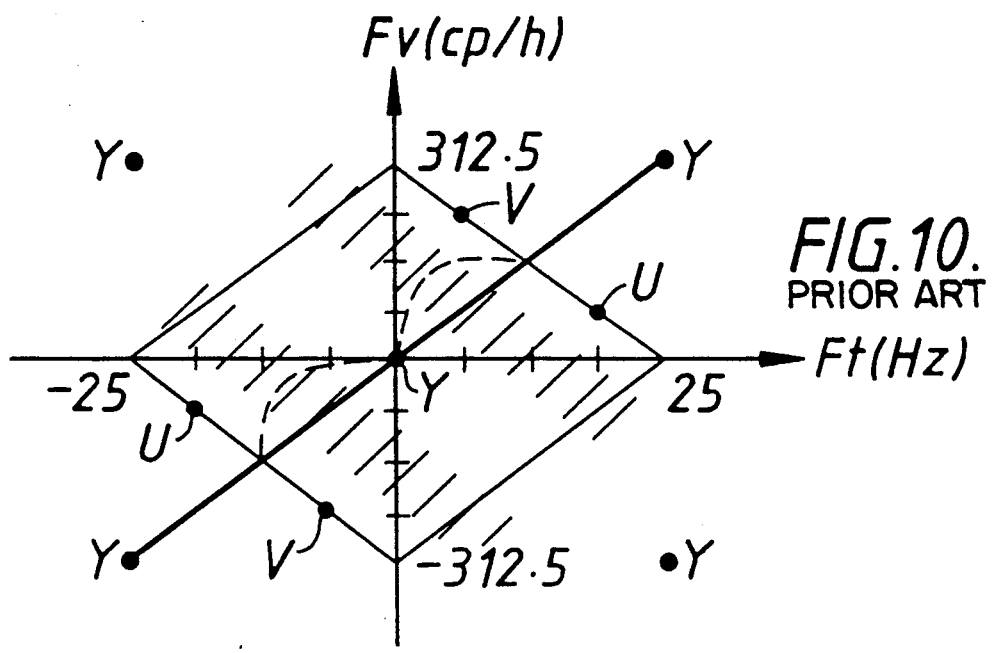
FIGS. 10 and 11 show characteristics of vertical/temporal (field delay) comb filters for measuring crosstalk for PAL and NTSC, respectively, superimposed on the spectra of FIGS. 2 and 3, respectively.
Figure 11:
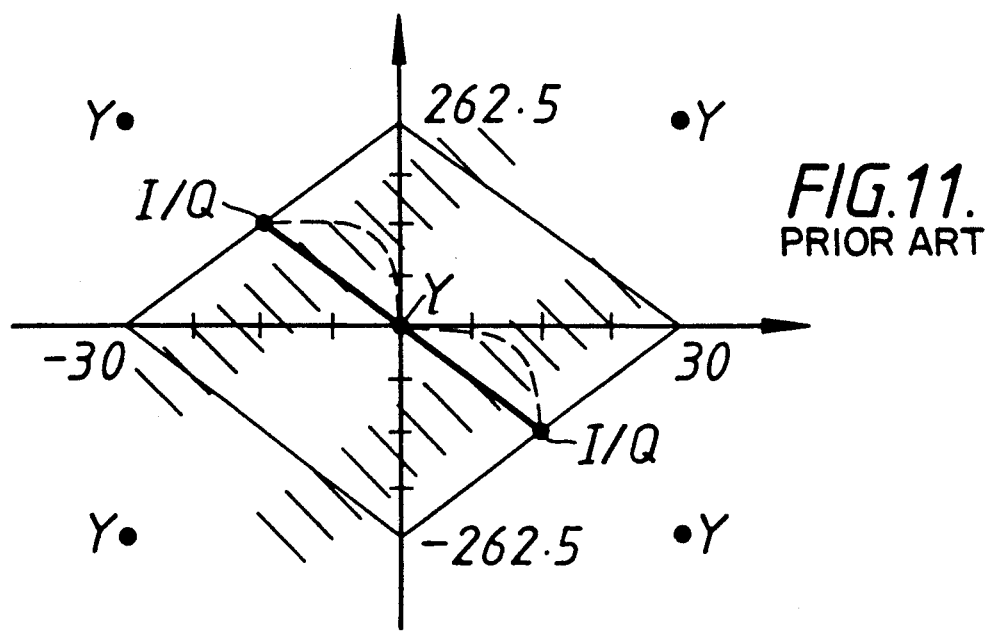

FIGS. 10 and 11 show the characteristics of the field crosstalk energy measurement filters for PAL and NTSC, respectively, superimposed on the spectra of FIGS. 2 and 3, respectively. The characteristics are shown in FIGS. 10 and 11 in a similar way to that in which the characteristics of the chrominance separation vertical/temporal (field delay) comb filters are shown in FIGS. 6 and 7, except that, in FIGS. 10 and 11, the hatched areas represent passbands rather than the stopbands. It will be noted (see also the dotted lines) that in the case of FIGS. 10 and 11 the characteristics have nulls at the diagonal (vertical/temporal) positions of both the luminance spectral energy centers Y and the chrominance spectral energy centers U and V (or I/Q) and have peaks at positions spaced diagonally between the centers. Thus, the field crosstalk energy measurement filters pass vertical/temporal energy which is located between the diagonal (vertical/temporal) positions of the luminance and chrominance spectral energy centers, whereby the outputs of the filters are representative of field (vertical/temporal) crosstalk energy.

Figure 12:
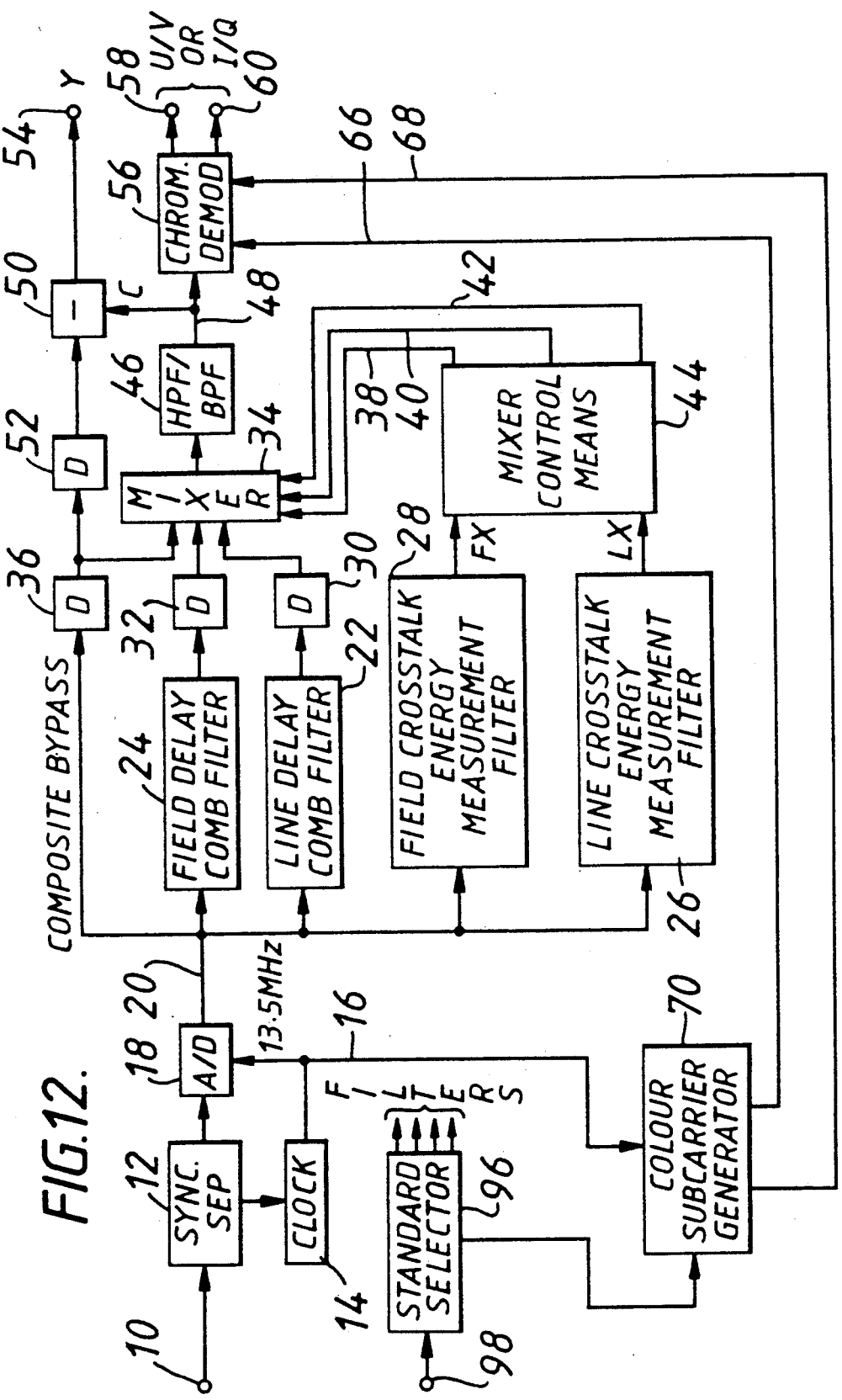
FIG. 12 is a block schematic circuit diagram of an apparatus embodying the invention for decoding a composite digital video signal.

FIG. 12 is a block schematic circuit diagram of an apparatus embodying the invention for decoding a composite digital video signal. In the apparatus shown in FIG. 12, a composite analog input video signal (PAL or NTSC) is supplied from an input terminal 10 to a synchronization signal separator 12. A clock signal generator 14 is connected to the synchronization signal separator 12 and is operative to generate, on a line 16, a 13.5 MHz clock signal which is locked to the line frequency (supplied from the synchronization signal separator 12) of the input video signal and is supplied to an analog to digital (A/D) converter 18 which samples the analog composite video input signal at the clock frequency of 13.5 MHz to produce a digital composite video signal on a bus 20. As mentioned above, the use of a line-locked sampling frequency of 13.5 MHz (in accordance with CCIR Recommendation 601) for sampling an analog composite video signal results in an orthogonal sampling structure (for both PAL and NTSC) enabling the use of line and field-based filtering for separation of the luminance and chrominance components of the composite video signal, since all of the samples in all of the lines of each field are disposed orthogonally with respect to one another.

The digital composite video signal on the bus 20 is applied to:
- a vertical (line delay) chrominance separation comb filter 22 having a characteristic as shown in FIG. 4 (for PAL) or FIG. 5 (for NTSC);
- a vertical/temporal (field delay) chrominance separation comb filter 24 having a characteristic as shown in FIG. 6 (for PAL) or FIG. 7 (for NTSC);
- a line crosstalk energy measurement filter 26 having a characteristic as shown in FIG. 8 (for PAL) or FIG. 9 (for NTSC); and
- a field crosstalk energy measurement filter 28 having a characteristic as shown in FIG. 10 (for PAL) or FIG. 11 (for NTSC).

Combed (comb filtered) output signals from the chrominance separation comb filters 22 and 24 are passed via respective delay circuits 30 and 32 to respective inputs of a mixer 34 described in more detail below with reference to FIG. 16. The digital composite signal on the bus 20 is also passed directly (i.e. bypassing the chrominance separation comb filters 22 and 24) to a third input of the mixer 34 via a delay circuit 36. The respective delays provided by the delay circuits 30, 32 and 36 are selected such that the signals arriving at the respective inputs of the mixer 34 have the same timing.

The mixer 34 mixes the three signals applied to its respective inputs at a mixing ratio determined by control signals applied thereto on a group of three busses 38, 40 and 42 from a mixer control means 44. the mixing ratio is varied in accordance with the control signals such that, at any one time (i.e. for any one sample), the mixed output signal of the mixer 34 comprises a proportion (from zero to 100%) of each of its three input signals, the proportions adding up to unity (100%). The mixer control means 44 generates the control signals, as described in more detail below with reference to FIG. 16, from a field (vertical/temporal) crosstalk energy measurement signal FX obtained from the field crosstalk energy measurement filter 28 and a line (vertical) crosstalk energy measurement signal LX obtained from the line crosstalk energy measurement filter 26. The signal FX is representative of vertical/temporal (field) crosstalk energy, which results from picture movement and has a magnitude dependent on the extent of movement as well as the type of picture, and the signal LX is representative of vertical (line) crosstalk energy, which is caused at least predominantly by high vertical picture energy (which is not necessarily associated with picture movement and can therefore arise in the case of both static and moving pictures).

The resultant mixed output signal from the mixer 34 is passed to a filter 46, which may be a high pass filter (HPF) or a band pass filter (BPF). The filter 46 is present for the following reason. Although the inputs to the mixer 34 from the comb filters 22 and 24 are combed chrominance, the bypassed composite signal applied to the third input of the mixer has not been filtered and therefore contains both luminance and chrominance information over the whole composite signal frequency spectrum (e.g. 0 to 5.5 MHz). The lower frequency limit of the filter 46 is chosen to be in the region of 3 MHz or so for PAL and 2 MHz or so for NTSC whereby, for both PAL and NTSC, the luminance information below the lower limit of the color region of the spectrum is cut off. (In other words, the proportion of the bypassed composite video signal supplied to the mixer 34 is effectively subjected to simple filtering (to remove luminance) after it has been mixed with the comb filtered signals in the mixer.) The filtering effected in the filter 46 also has the effect of cutting off any extraneous information in the spectral region below the lower limit of the color region that might be passed by the chrominance separation comb filters 22 and 24, in that they operate over the whole spectrum. Should the filter 46 be a band pass filter, its upper cut-off point will be chosen to be at or above the upper end of the composite video signal spectrum so as to cut off any extraneous spectral component above the signal spectrum that may have arrived at the mixer 34 via any of its inputs.

The output signal of the filter 46, which is, of course, the separated chrominance component of the digital composite video signal, is passed via a bus 48 to one input of a subtracter 50. The bypassed composite signal as applied to the third input of the mixer 34 is passed via a delay circuit 52 to another input of the subtracter 50. (The delay provided by the delay circuit 52 is chosen to equal that between the inputs of the mixer 34 and the output of the filter 46 whereby the signals applied to the respective inputs of the subtracter 50 have the same timing.) The subtracter 50 subtracts the chrominance component on the bus 48 from the composite signal to provide the luminance component Y, which is supplied to an output 54, whereby both the luminance and chrominance components have been separated.

In that the subtracter 50 has separated the chrominance component from the composite signal after the chrominance component has been comb filtered on a line and field basis by the comb filters 22 and 24, the luminance output from the subtracter 50 can, in effect, be considered as if it had been filtered by line and field delay comb filters having characteristics which are the converse of those of the chrominance separation comb filters 22 and 24.

The separated chrominance component on the bus 48 may then be passed to a chrominance demodulator 56 to separate it into its original color difference signals (U/V for PAL or I/Q for NTSC) at baseband and apply them to outputs 58, 60, whereby the digital composite video signal has been decoded to provided luminance (Y) and color difference signals (U/V or I/Q) at baseband.

Figure 13:
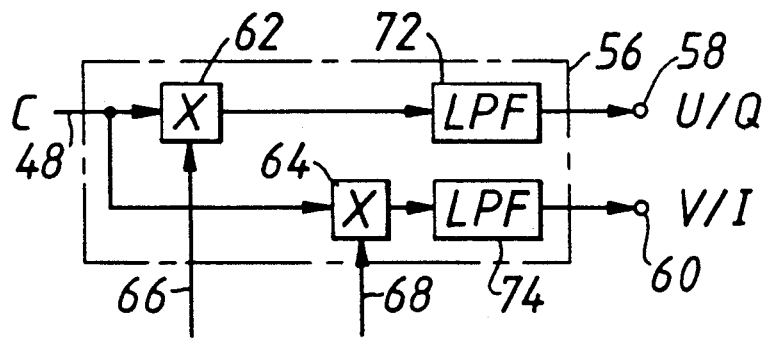
FIG. 13 shows a chrominance demodulator of the apparatus of FIG. 12.

The chrominance demodulator 56 may be of the form shown in FIG. 13. As shown in FIG. 13, the chrominance component on the bus 48 is supplied to respective first inputs of a pair of multipliers 62 and 64. Second inputs of the multipliers 62 and 64 are connected via busses 66 and 68, respectively, to receive relatively phase-displaced color subcarrier signals (shown in FIG. 13 for PAL and NTSC, respectively) which are produced at the appropriate frequency (4.43 MHz for PAL and 3.58 MHz for NTSC) by a color subcarrier generator 70 from the 13.5 MHz sampling clock signal on the line 16, whereby the chrominance component is demodulated. The color subcarrier generator 70 is locked to the subcarrier burst in the composite digital video signal in a manner known per se in order to ensure that the modulation is synchronous.

The outputs of the multipliers 62 and 64 are connected to the outputs 58 and 60 via respective low pass filters (LPFs) 72 and 74. The filters 72 and 74, which may be finite impulse response (FIR) filters, provide the correct color bandwidths for the color difference signals (e.g., in the NTSC system, 1.5 MHz for I and 0.5 MHz for Q). They also should provide good out of band attenuation to ensure the elimination of alias because, at this point, the color sampling rate is reduced to 6.75 MHz to conform to CCIR Recommendation 601.

The luminance component Y on the output 54 and the color difference signals U/V or I/Q on the terminals 58 and 60 may then be combined in a manner known per se, to provide, for example, an analog R-G-B output, and/or an analog Y/R-Y/B-Y output and/or a digital R-G-B output.

Figure 14:
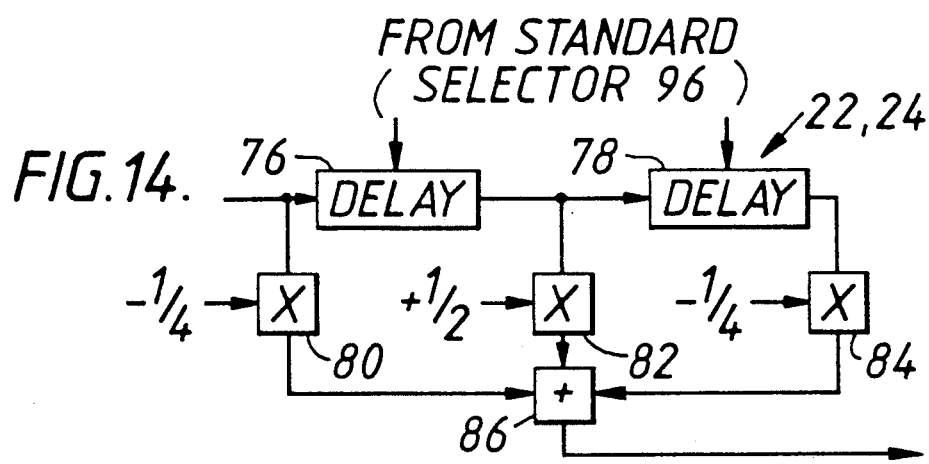
FIG. 14 shows the configuration of both vertical (line delay) and vertical/temporal (field delay) comb filters used for chrominance separation in the apparatus of FIG. 12 (and having the characteristics shown in FIGS. 4 to 7)

FIG. 14 shows an example of an FIR filter configuration that can be used for both the line delay and field delay chrominance separation comb filters 22 and 24, in each case for both PAL and NTSC. The filter input is connected to two tandem-connected delays 76, 78. The filter has three taps (at the input of the first delay 76, at the junction of the delays 76 and 78 and at the output of the delay 78) which are connected to first inputs of respective multipliers 80, 82 and 84. Weighting coefficients of $-\frac{1}{4}$, $+\frac{1}{2}$ and $-\frac{1}{4}$ are applied to second inputs of the multipliers 80, 82 and 84, respectively. The coefficients are alternately negative and positive due to the change of phase of chrominance (90° for PAL and 180° for NTSC) between lines—either within a field or between fields—in both PAL and NTSC, whereby the filter takes account of chrominance and ignores luminance (which does not change phase between lines). The outputs of the multipliers 80, 82 and 84 are summed in an adder 86 to produce the output of the filter.

The values of the delays 76 and 78 will vary in accordance with whether the filter is a line delay or a field delay filter and in accordance with whether the filter has to act on a PAL or an NTSC signal. In all cases, however, the delay is expressed in units of line delay H, namely the time delay of 64 microseconds between vertically adjacent positions in two successive lines of a field.

When the filter of FIG. 14 is a vertical (line delay) chrominance separation comb filter, the value of each of the delays 76 and 78 is 2H for PAL and 1H for NTSC, thereby to produce the vertical characteristics shown in FIGS. 4 and 5, respectively. The delay values differ between PAL and NTSC due to the different phase changes between lines (see above) encountered in the cases of PAL and NTSC, respectively.

When, on the other hand, the filter of FIG. 14 is a vertical/temporal (field delay) chrominance separation comb filter, the value of each of the delays 76 and 78 is 312H (i.e. one whole field delay of 321.5H, less ½H) for PAL and 263H (i.e. one whole field delay of 262.5H, plus ½H) for NTSC, thereby to produce the diagonal, vertical/temporal characteristics shown in FIGS. 6 and 7, respectively.

Figure 15:
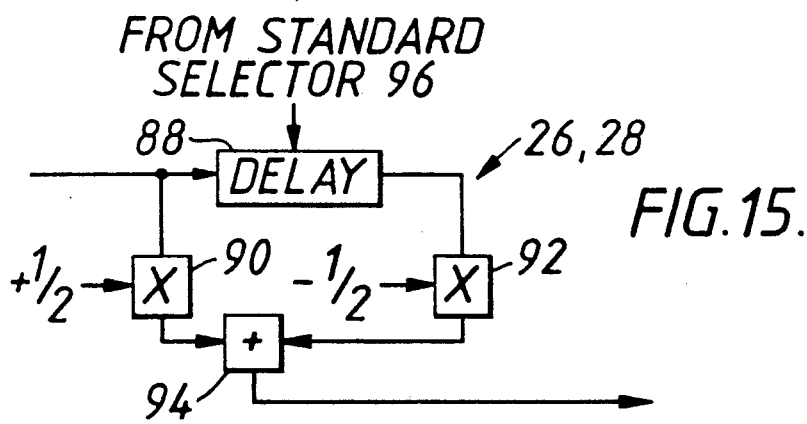
FIG. 15 shows the configuration of both vertical (line delay) and vertical/temporal (field delay) comb filters used for measuring line crosstalk and field crosstalk in the apparatus of FIG. 12 (and having the characteristics shown in FIGS. 8 to 11)

FIG. 15 shows an example of an FIR filter configuration that can be used for both the line crosstalk and field crosstalk energy measurement filters 26 and 28, in each case for both PAL and NTSC. The filter input is connected to a single delay 88 which has taps at its respective ends connected to first inputs of respective multipliers 90 and 92. Weighting coefficients of +½ and −½ are applied to second inputs of the multipliers 90 and 92, respectively. The coefficients are alternately negative and positive for the same reason as mentioned above in the description of FIG. 14. The outputs are summed in an adder 94 to produce the output of the filter.

When the filter of FIG. 15 is a line crosstalk energy measurement filter, the value of the delay 88 is 4H for PAL and 2H for NTSC, thereby to produce the vertical characteristics shown in FIGS. 8 and 9, respectively.

When, on the other hand, the filter of FIG. 15 is a field crosstalk energy measurement filter, the value of the delay 88 is 624H for PAL and 526H for NTSC, thereby to produce the diagonal, vertical/temporal characteristics shown in FIGS. 10 and 11, respectively.

While the apparatus as so far described could be embodied as a single standard (i.e. PAL or NTSC) decoder, it can in fact also readily be designed, in particular in view of the fact that the same configuration can be used for the filters 22, 24, 26 and 28 whether the standard is PAL or NTSC, as a multistandard (PAL or NTSC) decoder. In this regard, it is to be observed that the 13.5 MHz line-locked sampling frequency is applicable to both PAL and NTSC. Thus, the major changes necessary to make the apparatus compatible with both PAL and NTSC are: (i) a facility to switch the delays 76, 78 and 88 in the filters 22, 24, 26 and 28 between the different values mentioned above (a change in the weighting coefficients is not needed); and (ii) a facility to switch the color subcarrier generator 70 so that it either produces a frequency of 4.43 MHz for PAL (with the phase relationship for PAL noted in FIG. 13) or a frequency of 3.58 MHz for NTSC (with the phase relationship for NTSC noted in FIG. 13). (Other minor changes also may be needed to switch between PAL and NTSC, such changes consisting of or including changing the lower limit of the filter 46 between about 3 MHz and 2 MHz (see above) and changing the characteristics of the filters 72 and 74 in the chrominance demodulator 56.)

In order to make the apparatus a multistandard (PAL/NTSC) decoder, it may be provided, as shown in FIG. 12, with a standard selector 96 which is controllable by a select standard signal applied to an input terminal 98 to cause the delays 76, 78 in the filters 22 and 24, and the delays 88 in the filters 26 and 28, to be switched between their different values (as mentioned above) appropriate to PAL and NTSC, to cause the color subcarrier signal 70 to produce signals (for application to the chrominance demodulator 56) appropriate to PAL or NTSC, and to effect the minor changes mentioned above.

It should be appreciated that, in order to avoid redundancy in circuit components, each of the filters 22, 24, 26 and 28 need not be provided with respective sets of the delays 76, 78 and 80. (This applies whether the decoder is single standard or multistandard). Thus, it is possible to combine the various delays of the various filters in the form of a memory block constituted by a block of line delays and field delays, the multipliers 80, 82, 84, 90 and 92 of the filters being tapped into the block at appropriate places. When the decoder is multistandard, the switches for selecting between the delays appropriate for PAL and NTSC operation can be incorporated in the memory block.

The terms PAL and NTSC have been used above, at least to some extent, as implying the type of transmission standard used in, for example, the U.K. and the U.S.A., respectively, in which the number of lines and field frequencies are 625/50 Hz and 525/60 Hz, respectively. It must be remembered, however, that the terms PAL and NTSC strictly apply only to the color systems used and are in principle independent of the number of lines and field frequency. The NTSC standard does not vary substantially over the countries in which it is employed from the FCC standard defined in the U.S.A., i.e. NTSC color system, 525 lines, 60 Hz field frequency and 3.58 MHz color subcarrier frequency. However, PAL transmission standards vary between different countries and can in fact be characterized fully only by the definition of a number of parameters including the color system (i.e. PAL) and various other factors such as number of lines, field frequency and color subcarrier frequency. A multistandard apparatus as described above will in fact work with PAL/I (the standard used in the U.K. and other countries), PAL/N (which is very similar to PAL/I but has a color subcarrier frequency of 3.58 MHz) and PAL/M (which uses the PAL color system but otherwise is similar to NTSC), as well at NTSC. Thus, for PAL/I and NTSC, the delays in the filters 22, 24, 26 and 28 and the color subcarrier generator 70 must be switched as described above. For PAL/N, the filters 22, 24, 26 and 28 are switched as for PAL and the color subcarrier generator 70 is switched to provide color subcarrier signals which have the same phase relationship as for PAL/I, but a similar frequency to that used for NTSC. (The frequency is not exactly the same as NTSC, the exact frequencies for NTSC and PAL/N being 3579545±10 Hz and 3582056.25±5 Hz, respectively). For PAL/M, the filters 22, 24, 26 and 28 are switched as for NTSC and the color subcarrier generator 70 is switched to provide color subcarrier signals which have the same phase relationship as PAL/I, but a similar frequency (3575611.49±10 Hz) to that (3579545±10 Hz) used for NTSC.

Figure 16:
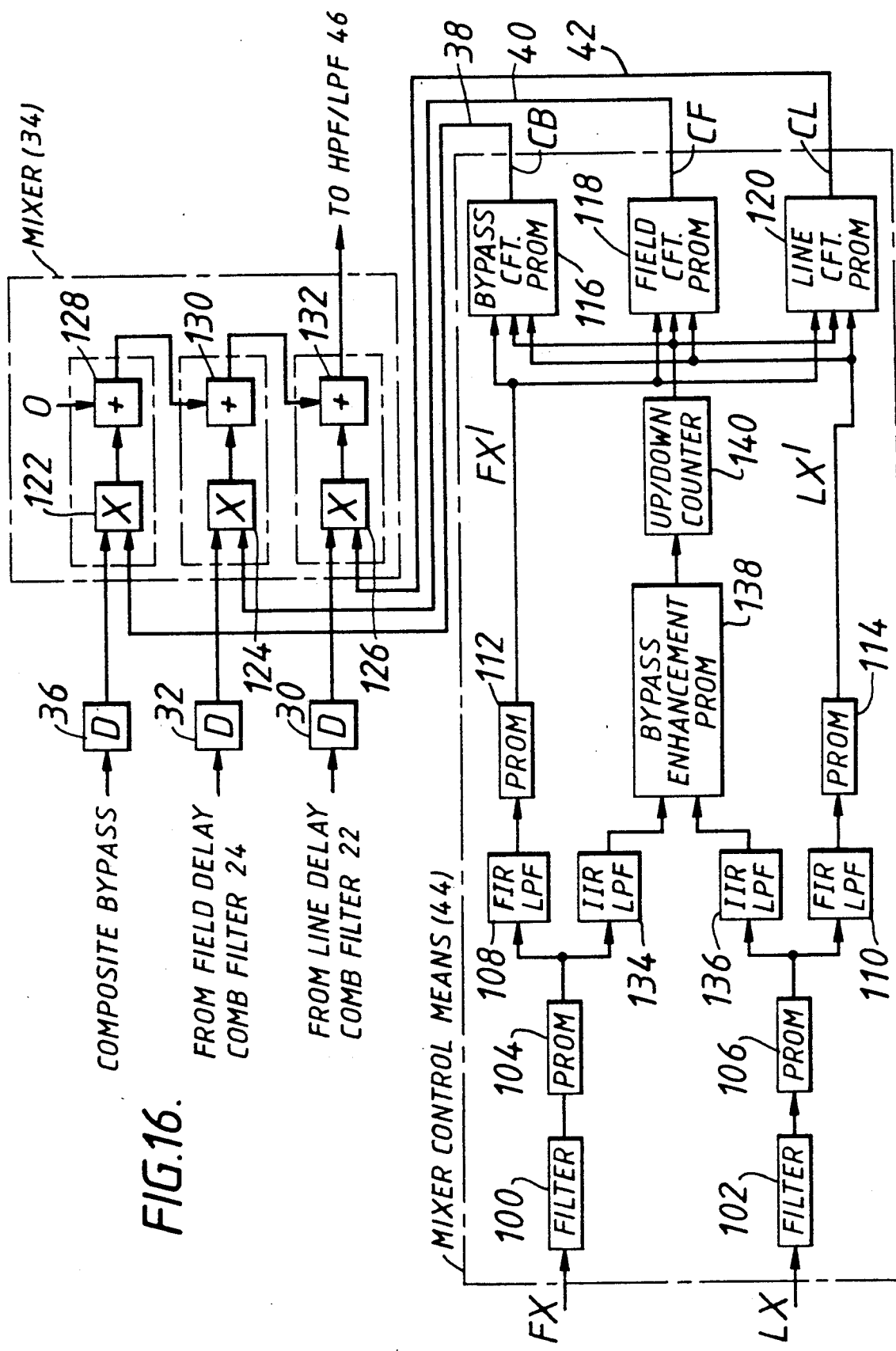
FIG. 16 shows in more detail a mixer and a mixer control means of the apparatus of FIG. 12.

FIG. 16 shows in more detail the mixer 34 and mixer control means 44 shown only in outline in FIG. 12. Considering first the mixer control means 44, the field crosstalk energy measurement signal FX from the measurement filter 28 and the line crosstalk energy measurement signal LX from the line crosstalk energy measurement filter 26 are supplied to respective high pass or band pass filters 100 and 102 which limit the spectral region of measurement to the modulated color bandwidth. The measurement signals FX and LX are then passed to respective programmable read only memories (PROMs) 104 and 106 which function to discard the signs of their input signals (which may be positive or negative) since only the absolute value of the crosstalk measurements are of significance. From the PROMs 104 and 106, the signals are passed via respective FIR low pass filters (LPFs) 108 and 110 which filter out noise (which has a high frequency characteristic) from the signals, to PROMs 112 and 114 which serve only to reduce the number of bits in the signal to reduce hardware requirements. The modified field and line energy measurement signals emerging from the PROMs 112 and 114, hereinafter identified as FX' and LX' respectively, are each passed to respective inputs of each of a bypass coefficient PROM 116, a field coefficient PROM 118 and a line coefficient PROM 120. Each of the PROMs 116, 118, 120 is responsive to the values of the signals FX' and FL' applied thereto to produce, on a respective one of the busses 38, 40 and 42 (which are connected to outputs of the PROMs 116, 118 and 120, respectively), on a sample by sample basis, a respective coefficient. Specifically, the PROM 116 produces a bypass coefficient CB on the bus 38, the PROM 118 produces a field coefficient CF on the bus 40, and the PROM 120 produces a line coefficient CL on the bus 42. Each of the PROMs 116, 118 and 120 is programmed to respond to the values of the signals FX' and LX' in a respective different way. That is to say, if each of the coefficients CB, CF and CL were plotted on a graph on which the axes are FX' and LX', the lines representing how the values of CB, CF and CL vary with FX' and FL' will differ from one another. Also, the PROMs 116, 118 and 120 are programmed such that, at any time, the values of the coefficients, CB, CF and Cl add up to unity. This is because, as will now be described, the values of the coefficients CB, CF and CL are used to control the proportions in which the mixer 34 mixes the bypassed composite video signal, the line delay combed chrominance signal (i.e. the chrominance signal separated by the line delay comb filter 22) and the field delay combed chrominance signal (i.e. the chrominance signal separated by the field delay comb filter 24), respectively, in order to produce the mixed output signal.

The mixer 34 comprises three multipliers 122, 124 and 126 and three adders 128, 130 and 132. First inputs of the multipliers 122, 124 and 126 are connected to receive the bypassed composite signal, the field delay combed chrominance signal and the line delay combed chrominance signal, respectively. Second inputs of the multipliers 122, 124 and 126 are connected to receive the coefficients CB, CF and CL, respectively. The output of the multiplier 122 is connected to one input of the adder 128, which has a second ("carry") input set to zero. The output of the multiplier 124 is connected to one input of the adder 130, which has a second ("carry") input connected to the output of the adder 128. The output of the multiplier 126 is connected to one input of the adder 132, which has a second ("carry") input connected to the output of the adder 130. The output of the adder 132, which forms the output of the mixer 34, thus produces a mixed signal in which the proportions of the bypassed composite signal, the field delay combed chrominance signal and the line delay combed chrominance signal (i.e. the mixing ratio therebetween) are governed by the coefficients CB, CF and CL, respectively, produced by the mixer control means 44.

The relationships (as programmed in the PROMs 116, 118 and 120) in accordance with which the coefficients CB, CF and CL vary with the field and line energy crosstalk signals FX' and LX' (that is the ratio in accordance with which the mixer 34 mixes the three input signals thereto in accordance with the measured crosstalk) have to be determined on an empirical basis after examination of the result that different such relationships have on suppressing different kinds of cross effects obtained when different kinds of test pictures are displayed. A final decision on the relationships is very much a subjective matter since it is a matter of subjective opinion, based on examination of cross-effects occurring in displayed test pictures, which relationships produce the best results. In other words, the way in which the mixer 34 is controlled to vary the mixing ratio between the three signals applied thereto in response to the measured field an line crosstalk is, in the final analysis, a matter of subjective choice. Two examples of how to select the relationships will now be set forth, though it is emphasize that other very different approaches, giving very different results, could well be adopted.

Figure 17:
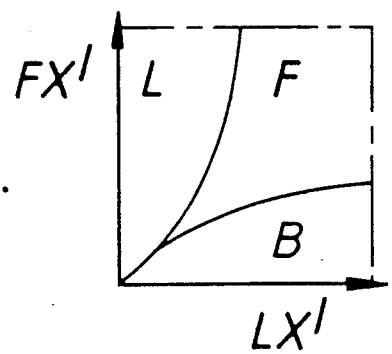
FIG. 17 is a schematic representation of a purely illustrative example of one way in which the mixer control means might be responsive to line and field crosstalk energy measured by the line delay and field delay crosstalk energy measurement filters to control the proportions in which the mixer combines a chrominance signal separated from a composite video signal by the line delay chrominance separation comb filter, a chrominance signal separated from the composite video signal by the field delay chrominance separation comb filter and the composite signal on a path bypassing the chrominance separation comb filters.

The first of the above-mentioned exemplary ways of establishing the relationships programmed in the PROMs 116, 118 and 120 adopts the following general guidelines. When, at one extreme, the picture has a high degree of vertical energy but not much vertical/temporal energy, that is when the line crosstalk energy signal LX' is high with respect to the field crosstalk energy signal FX', which indicates that the line delay filter 22 is likely to break down to produce crosstalk, and that so also (though to a lesser extent) is the field delay filter 24, the coefficients CB, CF and CL are varied in a sense that the mixing ratio is biassed towards the mixed signal being predominantly bypassed composite, a lesser amount of field delay separated chrominance and a lesser amount still of line delay separated chrominance. That is, in this event, the coefficients comply with the relationship CB<CF<CL. At the other extreme, when the picture has a high degree of vertical/temporal energy and a relatively low amount of vertical energy, that is when the field crosstalk energy measurement signal FX' is high with respect to the line crosstalk energy measurement signal LX', which indicates that there is a lot of movement in the picture (which might cause the field delay filter 24 to break down but which will favor the line delay filter 22 because there is not a lot of vertical energy), the coefficients CB, CF and CL are varied in a sense to bias the mixing ratio towards being such that the mixed signal is formed predominantly from line delay separated chrominance, to a lesser extent from the field delay separated chrominance, and to a lesser extent still from bypassed composite. That is, in this event, the coefficients comply with the relationship CL<CF<CB. Between these extremes, and in fact for most pictures, field delay separated chrominance is preferred since, with a picture not having either an excessive amount of movement or an excessive amount of vertical energy, this mode gives the best picture. That is, in this event, the coefficients comply with the relationships CF<CL and CF<CB. The foregoing is shown highly schematically in FIG. 17, in which a plot of the field crosstalk energy measurement signal FX' against the line crosstalk energy measurement signal LX' is shown divided into three regions designated B (indicating that bypassed composite is predominant over field delay separated chrominance which is in turn predominant over line delay separated chrominance), F (indicating that field delay separated chrominance is predominant over line delay separated chrominance and over bypassed composite) and L (indicating that line delay separated chrominance is predominant over field delay separated chrominance which is in turn predominant over bypassed composite).

The second of the above-mentioned exemplifications of how the relationships between each of the coefficients CB, CF and CL and the field and line energy crosstalk signals FX' and LX' may be selected and programmed into the PROMs 116, 118 and 120 will now be described with reference to FIG. 18. The relationships in this exemplification are somewhat different than those described with reference to FIG. 17. The exemplification now to be described with reference to FIG. 18 is designed specifically for use with NTSC and a somewhat different implementation might be appropriate for PAL, in which case the standard selector 96 (FIG. 12) might be operative to switch between different sets of the PROMs 116, 118 and 120 containing different relationships when the standard is changed.

Figure 18:
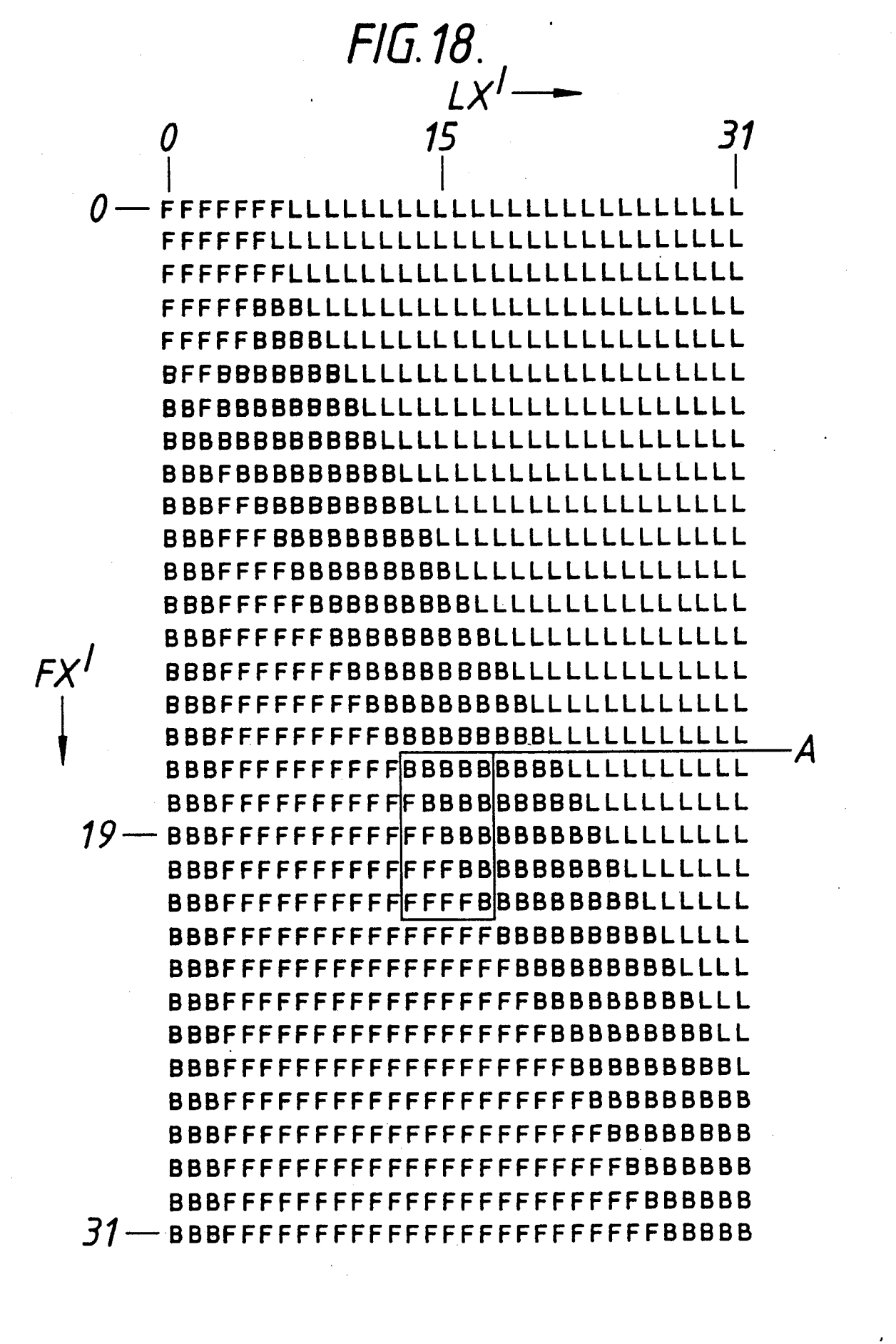

FIG. 18 shows a table of characters F, L and B plotted in a 32×32 array of positions (0 to 31) corresponding to a plot of FX' against LX'. The table is set up and edited manually, as a result of extensive study of test pictures, to decide empirically (and subjectively) on what is thought to be the best set of relationships. The characters F, L and B represent field delay separation (comb filtering), line delay separation (comb filtering) and bypassed composite, respectively. The table is then read by a program which generates the contents of the PROMs 116, 118 and 120. The program does this by calculating three numbers f, l and b which have values in the range of 0 to 255 (for an 8-bit ($2^8$) system, whereby f, l and b correspond to the values of the coefficients CF, CL and CB, respectively), and such that, for any location in the table, the values of f, l and b are proportional to the numbers of F's, L's and B's, respectively, in a programmable area centered on that location. For instance, if the programmable area has dimensions of (say) 5×5, the area will be disposed at the position A shown in FIG. 18 for the table location FX'=19 and LX'=15. In this position, as can be seen, there are equal numbers of F's and B's and no L's. Thus, for this location, CF=0.5, CB=0.5 and CL=0. If the position A of the area is moved, for example to the right in FIG. 18, CF will decrease and CB will increase. If the position is moved to the right by five or more table locations, it will be seen that CF will become zero and CL will become non-zero.

As indicated above, high vertical picture energy representative of sharp vertical transitions (i.e. luminance and/or (in particular) chrominance transitions in a vertical direction across a horizontally extending boundary) can give rise to a particular problem. The mixer control means 44 includes a vertical transition detector which is operative to detect vertical transitions and to over-ride the programs of the PROMs 116, 118 and 120 in the event of detecting such transitions to bias the mixing ratio to increase (e.g. to 100%) the proportion of bypassed composite in the output of the mixer 34. Referring to FIG. 12, the vertical transition detector comprises a pair of noise reduction infinite impulse response (IIR) low pass filters (LPFs) 134 and 136 having inputs connected to the outputs of the PROMs 104 and 106, respectively, a bypass enhancement PROM 138 having inputs connected to outputs of the IIR LPFs 134 and 136, and an up/down counter 140 having an input connected to an output of the PROM 138 and an output connected to a further input of each of the PROMs 116, 118 and 120. The bypass enhancement PROM 138 is programmed to be responsive to its two inputs as follows. If the inputs are equal and each greater than zero the PROM 138 increments the counter 140; if the relationship of the inputs is uncertain the PROM holds the count; and otherwise it causes the counter 140 to count down.

Figure 19:
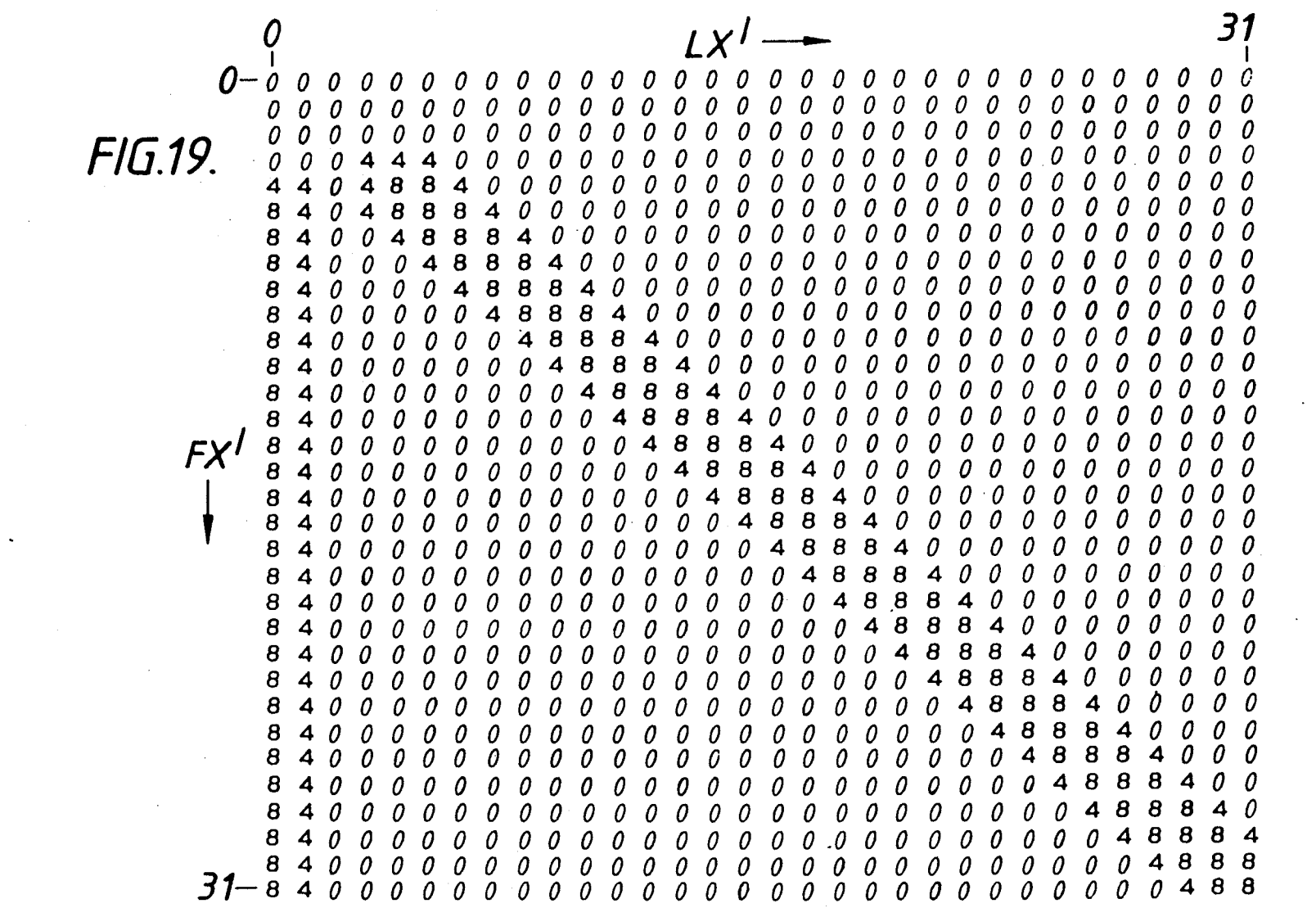

Following on from the example given above, with reference to FIG. 18, of how the coefficient PROMs 116, 118 and 120 can be programmed, the bypass enhancement PROM 138 can, for example, be programmed by means of the same program used to program the coefficient PROMs from the table shown in FIG. 18. Thus, the program further weights the number b (the coefficient CB) according to the value of the three most significant bits of the address of the bypass coefficient PROM 116. It does this in such a way that the number b can only be equal to 255 (i.e. the coefficient CB can only be equal to unity) if the output of the counter 140 driven by the bypass enhancement PROM 138 is equal to 1111 or 1110, the least significant bit of the counter 140 (which produces a 5-bit output) being ignored. As the output of the counter 140 decreases to 0000, the number b is reduced accordingly, and the numbers f and l are increased, such that the condition f+l+b=255 (CF+CL+CB=1) is maintained. The contents of the bypass enhancement PROM 138 in the case of the table shown in FIG. 18 are shown in a table represented in FIG. 19. The inputs of the PROM 138 are the five least significant bits of the outputs of the IIR LPFs 134 and 136. In the table represented in FIG. 19, the value 8 makes the counter 140 count up, the value 4 makes it hold it count and value 0 makes it count down.

The apparatus described above can, of course, be modified without departing from the scope of the invention. For instance it would be possible in principle (though it might involve extra hardware and circuit changes) to replace the chrominance separation line delay and field delay comb filters 22 and 24 by luminance separation line delay and field delay comb filters (having characteristics which are the converse of the filters 22 and 24), and to make consequential changes (including changing the filter 46 to a low pass filter excluding the color region of the composite signal spectrum), whereby the output on the bus 48 would be luminance (rather than chrominance) and would be subtracted from the composite signal in the subtracter 50 to form the chrominance signal, which could then be demodulated in the chrominance demodulator 54.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. ("carry CL

We claim:

1. Apparatus for separating a component of a composite digital video signal including luminance and chrominance components, the apparatus comprising:
   crosstalk measuring means for measuring crosstalk between said luminance and chrominance components of the composite digital video signal to produce a crosstalk signal;
   vertical comb filtering means for separating one of said luminance and chrominance components from said composite digital video signal to produce a first filtered output signal;
   vertical/temporal comb filtering means for separating said one of said luminance and chrominance components from said composite digital video signal to produce a second filtered output signal; and
   mixing means operative to mix respective proportions of said first filtered output signal and said second filtered output signal responsive to said crosstalk signal to produce said one of said luminance and chrominance components having reduced cross effects therein.

2. Apparatus according to claim 1, in which said mixing means is operative to mix the composite digital video signal with said first filtered output signal and said second filtered output signal produced by said vertical comb filtering means and said vertical/temporal comb filtering means such that said one of said luminance and chrominance components produced by said mixing means contains respective proportions of the composite digital video signal, said first filtered output signal and said second filtered output signal.

3. Apparatus according to claim 2, comprising filtering means for attenuating an undesired one of said luminance and chrominance components present in said one of said luminance and chrominance components produced by said mixing means originating in said respective proportion of the composite digital video signal.

4. Apparatus according to claim 2, wherein said mixing means includes a vertical transition detecting means for detecting a vertical transition in the picture represented by the digital composite video signal to increase the proportion of the composite digital video signal in said one of said luminance and chrominance components produced by said mixing means.

5. Apparatus according to claim 1, wherein said crosstalk measuring means comprises line crosstalk energy measurement filtering means for producing a line crosstalk energy measurement signal and field crosstalk energy measurement filtering means for producing a field crosstalk energy measurement signal, said line crosstalk energy measurement signal and said field crosstalk energy measurement signal comprising said crosstalk signal.

6. Apparatus according to claim 5, wherein:
   said mixing means is responsive to said crosstalk signal to produce coefficients CB, CF and CL indicating, respectively, the proportions of the composite digital video signal, the second filtered output signal from the vertical/temporal comb filtering means and the first filtered output signal from the vertical comb filtering means to be mixed to form said one of said luminance and chrominance components produced by said mixing means such that said coefficients CB, CF and CL add to a constant value.

7. Apparatus according to claim 5, further comprising:
   synchronization separating means for separating a line synchronizing signal from an input composite analog video signal;
   clock generating means responsive to the separated line synchronizing signal for generating a line-locked sampling signal of a frequency suitable for sampling either a 625 line/50 Hz field frequency analog composite video signal or a 525 line/60 Hz field frequency analog composite video signal;
   analog to digital converting means for converting the input analog composite video signal sampled at the frequency of said line-locked sampling signal to said composite digital video signal;
   said vertical comb filtering means, said vertical/temporal comb filtering means, said line crosstalk energy measurement filtering means and said field crosstalk energy measurement filtering means each including switchable delay means for selectably filtering either a 625 line/50 Hz or a 525 line/60 Hz composite digital video signal by altering only an amount of delay therein; and
   switching means for switching said switchable delay means of said vertical comb filtering means, said vertical/temporal comb filtering means, said line crosstalk energy measurement filtering means and said field crosstalk energy measurement filtering means for selectably processing one of a 625 line/50 Hz or a 525 line/60 Hz input composite analog video signal.

8. Apparatus according to claim 7, wherein said mixing means is operative to produce a chrominance component as said one of said luminance and chrominance components produced by said mixing means, said apparatus further comprising chrominance demodulating means for demodulating said chrominance component in response to a pair of phase-displaced subcarrier signals to produce color difference signals and color subcarrier generating means for producing said pair of phase-displaced subcarrier signals from said sampling signal, said color subcarrier generating means being operative to produce said pair of phase-displaced subcarrier signals at a color subcarrier frequency and with a phase relationship appropriate to that of the input composite analog video signal.

9. Apparatus according to claim 1, wherein said vertical comb filtering means and said vertical/temporal comb filtering means are operative to separate a chrominance component from the composite digital video signal.

10. Apparatus according to claim 1, including subtracting means for subtracting said one of said luminance and chrominance components produced by said mixing means from the composite digital video signal so as thereby to separate the other of said luminance and chrominance components therefrom.

11. A method of separating a component of a composite digital video signal, said method comprising:
   measuring crosstalk between luminance and chrominance components of the composite digital video signal to produce a crosstalk signal;
   separating a first version of one of said luminance and chrominance components from the composite digital video signal by a vertical comb filtering operation; and
   separating a second version of said one of said luminance and chrominance components from the composite digital video signal by a vertical/temporal comb filtering operation; and mixing respective proportions of said first version of said one of said luminance and chrominance components produced by the vertical comb filtering operation and said second version of said one of said luminance and chrominance components produced by the vertical/temporal comb filtering operation based on said crosstalk signal to produce a third version of said one of said luminance and chrominance components.

12. A method according to claim 11, wherein said mixing step further includes mixing the composite digital video signal with the first and second versions of said one of said luminance and chrominance components produced by the vertical comb filtering operation and the vertical/temporal comb filtering operation, respectively, whereby said third version of said one of said luminance and chrominance components contains respective proportions of the composite digital video signal and said first and second versions of said one of said luminance and chrominance components.

13. A method according to claim 12, further comprising the step of filtering said third version of said one of said luminance and chrominance components to attenuate an undesired one of said luminance and chrominance components present therein originating in the respective proportion of the composite digital video signal.

14. A method according to claim 12, wherein said mixing step further includes detecting a vertical transition in the picture represented by the digital composite video signal and increasing the proportion of the composite digital video signal in said third version of said one of said luminance and chrominance components based on the detection of a vertical transition.

15. A method according to claim 11, wherein the step of measuring crosstalk comprises producing a line crosstalk energy measurement signal and a field crosstalk energy measurement signal as said crosstalk signal.

16. A method according to claim 12, wherein the step of measuring crosstalk comprises producing a line crosstalk energy measurement signal and a field crosstalk energy measurement signal as said crosstalk signal, the method further comprising the step of producing, in response to the line crosstalk and field crosstalk energy measurement signals, coefficients CB, CF and CL indicating, respectively, the proportions of the composite digital video signal, the second version of said one of said luminance and chrominace signals produced by the vertical/temporal comb filtering operation and the first version of said one of said luminance and chrominance signals produced by the vertical comb filtering operation to be mixed to form said third version of said one of said luminance and chrominance components, said coefficients CB, CF and CL adding to a constant value.

17. A method according to claim 15, comprising:
separating a line synchronizing signal from an input composite analog video signal in the form of a 625 line/50 Hz field frequency signal or a 525 line/60 Hz field frequency signal;
generating, in response to the separated line synchronizing signal, a line-locked sampling signal of a frequency suitable for sampling said input analog composite video signal;
sampling the input analog composite video signal at the frequency of said line-locked sampling signal to produce the composite digital video signal;
carrying out the vertical comb filtering operation, the vertical/temporal comb filtering operation, the line crosstalk energy measurement signal production and the field crosstalk energy measurement signal production by means of respective filtering means having switchable delay means for processing one of a 625 line/50 Hz and a 525 line/60 Hz composite digital video signal by altering only an amount of delay thereof; and
switching the filters based upon a determination to process one of a 625 line/50 Hz and a 525 line/60 Hz input composite analog video signal.

18. A method according to claim 17, wherein the steps of separating first and second versions of said one of said luminance and chrominance components comprise separating respective first and second versions of the chrominance component of said composite digital video signal, the step of mixing comprises mixing respective proportions of said respective first and second versions of the chrominance component with a respective proportion of said composite digital video signal to produce a third version of said chrominance component, and wherein said method further comprises the steps of producing from said sampling signal a pair of phase-displaced subcarrier signals at a color subcarrier frequency and with a phase relationship appropriate to that of the input composite analog video signal and demodulating said third version of said chrominance component to produce color difference signals.

19. A method according to claim 11, wherein the steps of separating first and second versions of said one of said luminance and chrominance components comprise separating respective first and second versions of said chrominance component of said composite digital video signal.

20. A method according to claim 11, further comprising the step of subtracting said third version of said one of said luminance and chrominance components from the composite digital video signal so as thereby to separate the other of said luminance and chrominance components therefrom.

* * * * *